US008332855B2

(12) United States Patent
Dayal et al.

(10) Patent No.: US 8,332,855 B2
(45) Date of Patent: Dec. 11, 2012

(54) METHOD AND APPARATUS FOR ASSIGNING PRIORITIES TO COMPOSITE EVENTS

(75) Inventors: Pranav Dayal, San Diego, CA (US); Venugopal V. Veeravalli, Urbana, IL (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 12/619,504

(22) Filed: Nov. 16, 2009

(65) Prior Publication Data

US 2011/0010726 A1  Jan. 13, 2011

Related U.S. Application Data

(60) Provisional application No. 61/224,313, filed on Jul. 9, 2009, provisional application No. 61/243,605, filed on Sep. 18, 2009.

(51) Int. Cl.
G06F 9/455 (2006.01)
G06F 3/00 (2006.01)
G06F 9/44 (2006.01)
G06F 9/46 (2006.01)
G06F 13/00 (2006.01)

(52) U.S. Cl. ........ 718/102; 718/100; 718/101; 718/103; 719/318

(58) Field of Classification Search .............. 718/100, 718/101, 102, 103
See application file for complete search history.

(56) References Cited

U.S. PATENT DOCUMENTS

| 7,624,396 | B1* | 11/2009 | Isenberg | 719/314 |
|---|---|---|---|---|
| 2003/0172104 | A1* | 9/2003 | Hooman et al. | 709/103 |
| 2003/0204848 | A1* | 10/2003 | Cheng et al. | 725/58 |
| 2004/0009751 | A1 | 1/2004 | Michaelis et al. | |
| 2005/0125791 | A1* | 6/2005 | Welbon et al. | 718/100 |
| 2007/0283363 | A1* | 12/2007 | Nather | 719/318 |
| 2008/0057910 | A1* | 3/2008 | Thoresson et al. | 455/412.1 |
| 2008/0081663 | A1 | 4/2008 | Kasslin et al. | |
| 2008/0181181 | A1 | 7/2008 | Gorokhov et al. | |
| 2009/0100178 | A1* | 4/2009 | Gonzales et al. | 709/226 |
| 2009/0170532 | A1* | 7/2009 | Lee et al. | 455/456.3 |
| 2009/0254411 | A1* | 10/2009 | Bhattacharya et al. | 705/10 |
| 2009/0288089 | A1* | 11/2009 | Choi et al. | 718/103 |

(Continued)

OTHER PUBLICATIONS

International Search Report and Written Opinion—PCT/US2010/041617, International Search Authority—European Patent Office—Dec. 7, 2010.

*Primary Examiner* — Emerson Puente
*Assistant Examiner* — Charles Swift
(74) *Attorney, Agent, or Firm* — Rupit M. Patel

(57) ABSTRACT

Systems and methodologies are described herein that facilitate computation of composite priorities for composite events associated with a multi-radio wireless device. As described herein, respective priority values can be assigned to composite events (e.g., radio events associated with a plurality of distinct radios) in a variety of manners. Upon assignment of priority values, a radio coexistence manager and/or other suitable means can be utilized to selectively grant respective events from among a set of events that are identified within the same time period. In various examples described herein, priorities can be computed for composite events such that relative priorities of composite events are higher if the constituent atomic events of the composite events have higher priorities, such that the relative priority of a composite event is greater than the priority of any subset of its events, and/or according to any other suitable criteria.

39 Claims, 12 Drawing Sheets

U.S. PATENT DOCUMENTS

2009/0318152 A1* 12/2009 Maheshwari ................ 455/436
2009/0319472 A1* 12/2009 Jain et al. .......................... 707/2
2010/0161563 A1*  6/2010 Arunachalam ............... 707/674
2010/0174840 A1*  7/2010 Blainey et al. ................ 710/121
2010/0174873 A1*  7/2010 Friedman et al. ............. 711/151
2010/0330977 A1* 12/2010 Kadous et al. ................ 455/419
2011/0010726 A1*  1/2011 Dayal et al. ................... 719/318
2011/0171948 A1*  7/2011 Labuda et al. ............. 455/422.1

* cited by examiner

| x1 | | | 1 | | | |
|---|---|---|---|---|---|---|
| x2 | | | 2 | | | |
| x3 | | | 3 | 4 | 4 | |
| x1 | x2 | | 3 | 3 | | |
| x1 | x3 | | 4 | 5 | 5 | 5 |
| x2 | x3 | | 4 | 5 | 6 | 6 |
| x1 | x2 | x3 | 4 | 5 | 7 | 7 |
| | | | | | | |
| Forced Order: (x3) > (x1,x2) | | | | | | |

METHOD AND APPARATUS FOR ASSIGNING PRIORITIES TO COMPOSITE EVENTS

CROSS-REFERENCE

This application claims the benefit of U.S. Provisional Application Ser. No. 61/224,313, filed Jul. 9, 2009, and entitled "METHOD AND APPARATUS FOR ASSIGNING PRIORITIES TO COMPOSITE EVENTS," and 61/243,605, filed Sep. 18, 2009, and entitled "METHOD AND APPARATUS FOR ASSIGNING PRIORITIES TO COMPOSITE EVENTS," the entirety of which is incorporated herein by reference.

BACKGROUND

I. Field

The present disclosure relates generally to wireless communications, and more specifically to managing coexistence between multiple radios utilized by respective devices in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and Single-Carrier FDMA (SC-FDMA) systems.

Generally, a wireless multiple-access communication system can include a number of radios to support communication with different wireless communication systems. Respective radios can operate on certain frequency channels or bands or can have respective predefined requirements. For example, respective radios can operate on the basis of a predefined set of events, each of which can, in some cases, affect a wireless communication system in different manners. Such events can include, for example, atomic events as well as composite events that are composed of a plurality of atomic events. In view of at least the foregoing, it would be desirable to implement techniques for managing and prioritizing events associated with a wireless communication system.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a set of atomic events and respective priorities associated with the atomic events; identifying a set of composite events formed using respective subsets of the set of atomic events; and assigning respective priorities to the set of composite events such that respective priorities of composite events with substantially high-priority constituent atomic events are higher than respective priorities of composite events with lower-priority constituent atomic events and relative priorities of respective composite events are greater than priorities of respective subsets of the respective composite events.

A second aspect described herein relates to a wireless communications apparatus, which can comprise a memory that stores data relating to a set of atomic events and a set of composite events formed using respective subsets of the set of atomic events. The wireless communications apparatus can further comprise a processor configured to initialize the set of atomic events to respective corresponding priority values and to assign respective priority values to the set of composite events such that respective priority values of composite events with substantially high-priority constituent atomic events are higher than respective priority values of composite events with lower-priority constituent atomic events and priority values of respective composite events are greater than priority values of respective subsets of the respective composite events.

A third aspect relates to an apparatus, which can comprise means for identifying a set of atomic events and a set of composite events, the set of composite events respectively comprising one or more identified atomic events; means for initializing priority numbers of respective atomic events; and means for assigning priority numbers to respective composite events such that priority numbers of respective composite events with substantially high-priority constituent atomic events are higher than priority numbers of respective composite events with lower-priority constituent atomic events and relative priority numbers of composite events are greater than priority numbers of respective subsets of the composite events.

A fourth aspect described herein relates to a computer program product, which can include a computer-readable medium that comprises code for causing a computer to identify a set of atomic events and a set of composite events, the set of composite events respectively comprising one or more identified atomic events; code for causing a computer to initialize priority numbers of respective atomic events; and code for causing a computer to assign priority numbers to respective composite events such that priority numbers of respective composite events with substantially high-priority constituent atomic events are higher than priority numbers of respective composite events with lower-priority constituent atomic events and relative priority numbers of composite events are greater than priority numbers of respective subsets of the composite events.

A fifth aspect described herein relates to an integrated circuit operable to execute a set of machine-executable instructions. The set of machine-executable instructions can comprise identifying a set of atomic events and respective priority values associated with the atomic events; identifying a set of composite events formed using respective subsets of the set of atomic events; and assigning respective priority values to the set of composite events such that respective priority values of composite events with substantially high-priority constituent atomic events are higher than respective priority values of composite events with lower-priority constituent atomic events and relative priority values of respective composite events are greater than priority values of respective subsets of the respective composite events.

To the accomplishment of the foregoing and related ends, one or more aspects of the claimed subject matter comprise the features hereinafter fully described and particularly pointed out in the claims. The following description and the annexed drawings set forth in detail certain illustrative

DETAILED DESCRIPTION

Figure 1:
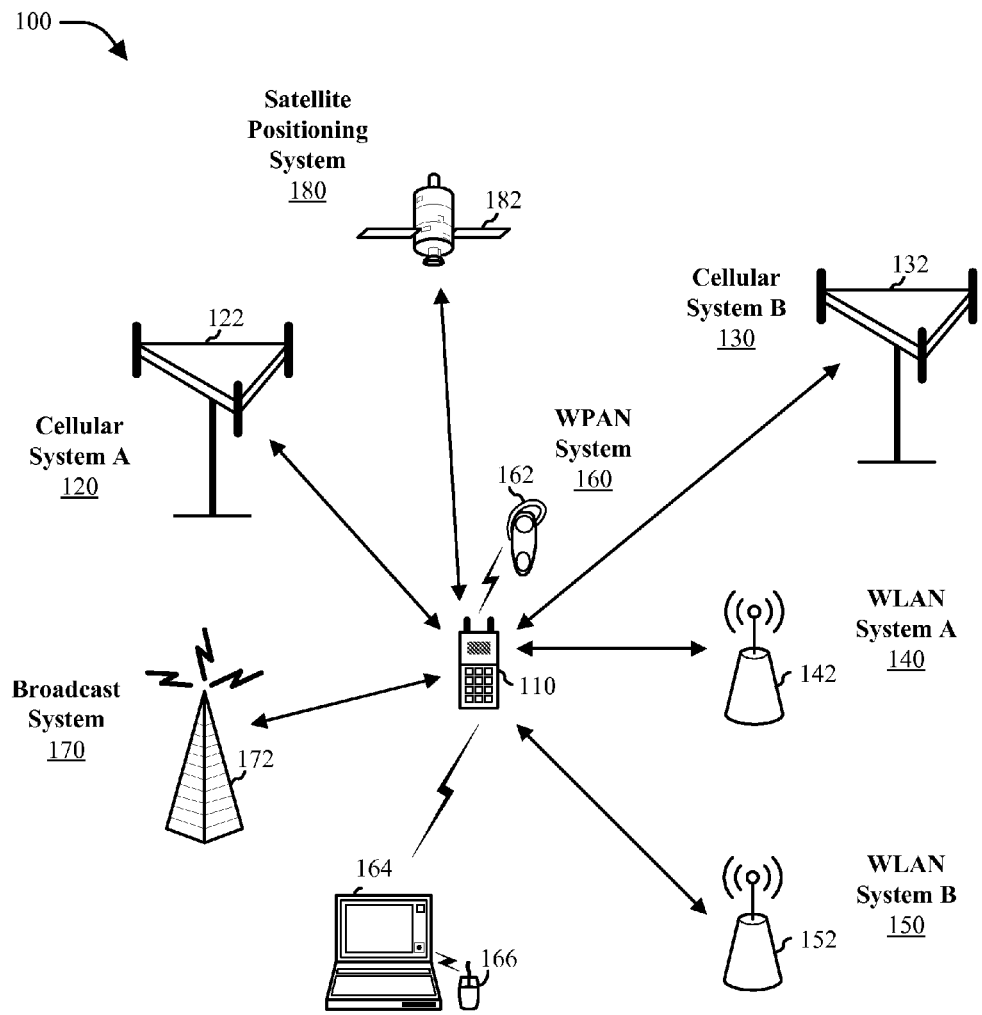
FIG. 1 is a block diagram of an example wireless communication environment in which various aspects described herein can function.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, it can be appreciated that various illustrative logical blocks, modules, circuits, algorithm steps, etc., described in connection with the disclosure herein can be implemented as electronic hardware, computer software, or combinations of both. To clearly illustrate this interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the disclosure herein can additionally or alternatively be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, or alternatively the processor can be any conventional processor, controller, microcontroller, state machine, or the like. A processor can also be implemented as a combination of computing devices, e.g., a combination of a DSP and a microprocessor, a plurality of microprocessors, one or more microprocessors in conjunction with a DSP core, or any other such configuration.

Furthermore, various functions of one or more example embodiments described herein can be implemented in hardware, software, firmware, or any combination thereof. If implemented in software, the functions can be stored on or transmitted as one or more instructions or code on a computer-readable medium. Computer-readable media can include both computer storage media and communication media. Communication media can include any medium that facilitates transfer of a computer program from one place to another. Likewise, storage media can include any available media that can be accessed by a general purpose or special purpose computer. By way of example, and not limitation, computer-readable media can comprise RAM, ROM, EEPROM, CD-ROM, digital versatile disc (DVD), blu-ray disc, or other optical disk storage, magnetic disk storage or other magnetic storage devices, and/or any other medium that can be used to carry or store desired program code means in the form of instructions or data structures and that can be accessed by a general-purpose or special-purpose computer or a general-purpose or special-purpose processor. Further, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and/or microwave, then such means are intended to be included in the definition of medium. "Disk" and "disc," as used herein, includes compact disc (CD), laser disc, optical disc, DVD, floppy disk, and blu-ray disc, where "disks" generally reproduce data magnetically while "discs" reproduce data optically (e.g., with lasers). Combinations of the above can also be included within the scope of computer-readable media.

Referring now to the drawings, FIG. 1 illustrates an example wireless communication environment 100 in which various aspects described herein can function. Wireless communication environment 100 can include a wireless device 110, which can be capable of communicating with multiple communication systems. These systems can include, for example, one or more cellular systems 120 and/or 130, one or more wireless local area network (WLAN) systems 140 and/or 150, one or more wireless personal area network (WPAN) systems 160, one or more broadcast systems 170, one or more satellite positioning systems 180, other systems not shown in FIG. 1, or any combination thereof. It should be appreciated that in the following description the terms "network" and "system" are often used interchangeably.

Cellular systems 120 and 130 can each be a CDMA, TDMA, FDMA, OFDMA, SC-FDMA, or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). In an aspect, cellular system 120 can include a number of base stations 122, which can support bi-directional communication for wireless devices within their coverage. Similarly, cellular system 130 can include a number of base stations 132 that can support bi-directional communication for wireless devices within their coverage.

WLAN systems 140 and 150 can respectively implement radio technologies such as IEEE 802.11 (Wi-Fi), Hiperlan, etc. WLAN system 140 can include one or more access points 142 that can support bi-directional communication. Similarly, WLAN system 150 can include one or more access points 152 that can support bi-directional communication. WPAN system 160 can implement a radio technology such as Bluetooth, IEEE 802.15, etc. Further, WPAN system 160 can support bi-directional communication for various devices such as wireless device 110, a headset 162, a computer 164, a mouse 166, or the like.

Broadcast system 170 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, broadcast system 170 can include one or more broadcast stations 172 that can support one-way communication.

Satellite positioning system 180 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, satellite positioning system 180 can include a number of satellites 182 that transmit signals used for position determination.

In an aspect, wireless device 110 can be stationary or mobile and can also be referred to as a user equipment (UE), a mobile station, a mobile equipment, a terminal, an access terminal, a subscriber unit, a station, etc. Wireless device 110 can be a cellular phone, a personal digital assistant (PDA), a wireless modem, a handheld device, a laptop computer, a cordless phone, a wireless local loop (WLL) station, etc. In addition, wireless device 110 can engage in two-way communication with cellular system 120 and/or 130, WLAN system 140 and/or 150, devices within WPAN system 160, and/or any other suitable system(s) and/or device(s). Wireless device 110 can additionally or alternatively receive signals from broadcast system 170 and/or satellite positioning system 180. In general, it can be appreciated that wireless device 110 can communicate with any number of systems at any given moment.

Figure 2:
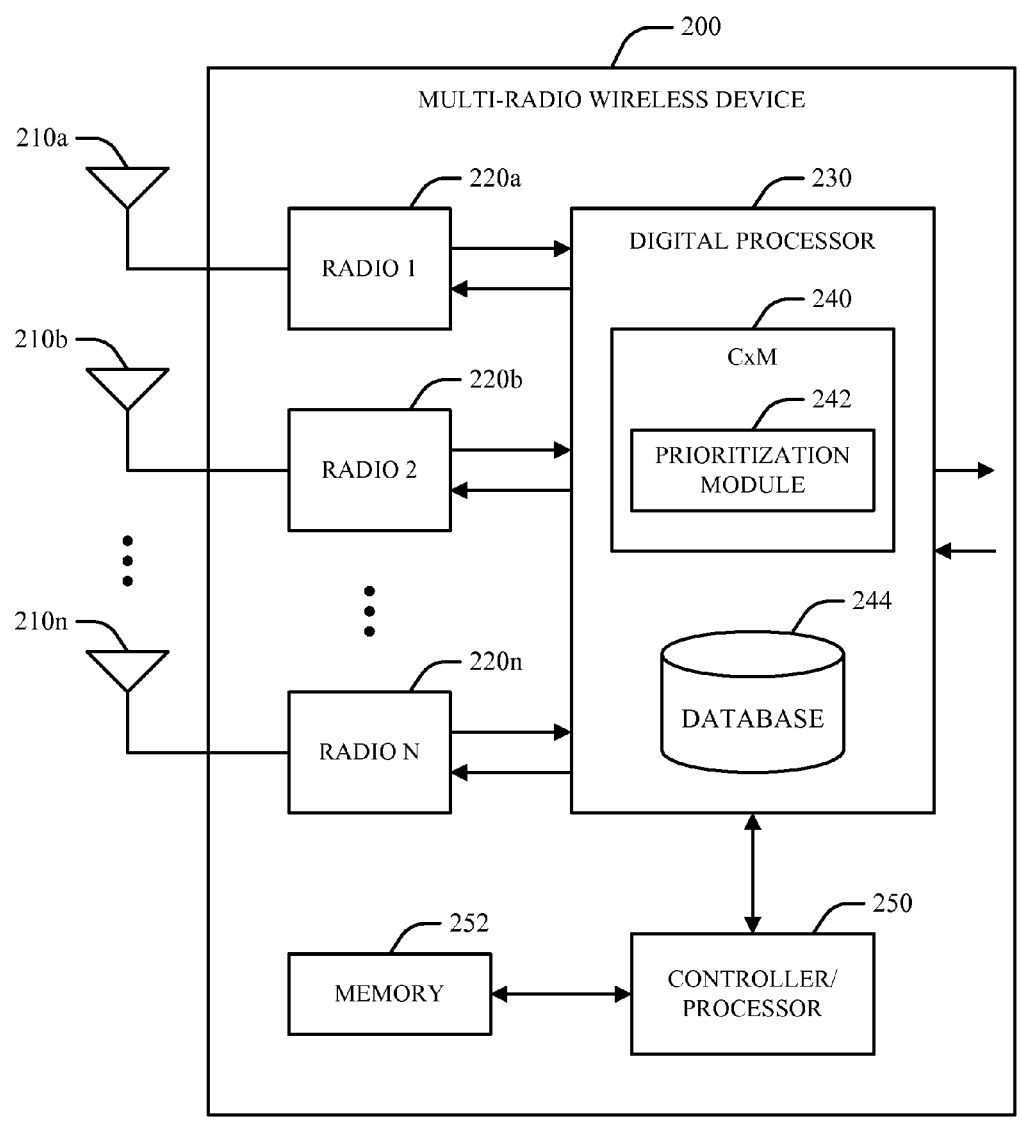
FIG. 2 is a block diagram of an example wireless device that can be operable to prioritize events in an associated wireless communication system in accordance with various aspects.

Turning next to FIG. 2, a block diagram is provided that illustrates an example design for a multi-radio wireless device 200. As FIG. 2 illustrates, wireless device 200 can include N radios 220a through 220n, which can be coupled to N antennas 210a through 210n, respectively, where N can be any integer value. It should be appreciated, however, that respective radios 220 can be coupled to any number of antennas 210 and that multiple radios 220 can also share a given antenna 210.

In general, a radio 220 can be a unit that radiates or emits energy in an electromagnetic spectrum, receives energy in an electromagnetic spectrum, or generates energy that propagates via conductive means. By way of example, a radio 220 can be a unit that transmits a signal to a system or a device or a unit that receives signals from a system or device. Accordingly, it can be appreciated that a radio 220 can be utilized to support wireless communication. In another example, a radio 220 can also be a unit (e.g., a screen on a computer, a circuit board, etc.) that emits noise, which can impact the performance of other radios. Accordingly, it can be further appreciated that a radio 220 can also be a unit that emits noise and interference without supporting wireless communication.

In accordance with one aspect, respective radios 220 can support communication with one or more systems. Multiple radios 220 can additionally or alternatively be used for a given system, e.g., to transmit or receive on different frequency bands (e.g., cellular and PCS bands).

In accordance with another aspect, a digital processor 230 can be coupled to radios 220a through 220n and can perform various functions, such as processing for data being transmitted or received via radios 220. The processing for each radio 220 can be dependent on the radio technology supported by that radio and can include encryption, encoding, modulation, etc., for a transmitter; demodulation, decoding, decryption, etc., for a receiver, or the like. In one example, digital processor 230 can include a coexistence manager (CxM) 240 that can control the operation of radios 220 in order to improve the performance of wireless device 200 as generally described herein. CxM 240 can have access to a database 242, which can store information used to control the operation of radios 220.

For simplicity, digital processor 230 is shown in FIG. 2 as a single processor. However, it should be appreciated that digital processor 230 can comprise any number of processors, controllers, memories, etc. In one example, a controller/processor 250 can direct the operation of various units within wireless device 200. Additionally or alternatively, a memory 252 can be used to store program codes and data for wireless device 200. Digital processor 230, controller/processor 250, and memory 252 can be implemented on one or more integrated circuits (ICs), application specific integrated circuits (ASICs), etc. By way of specific, non-limiting example, digital processor 230 can be implemented on a Mobile Station Modem (MSM) ASIC.

Figure 3:
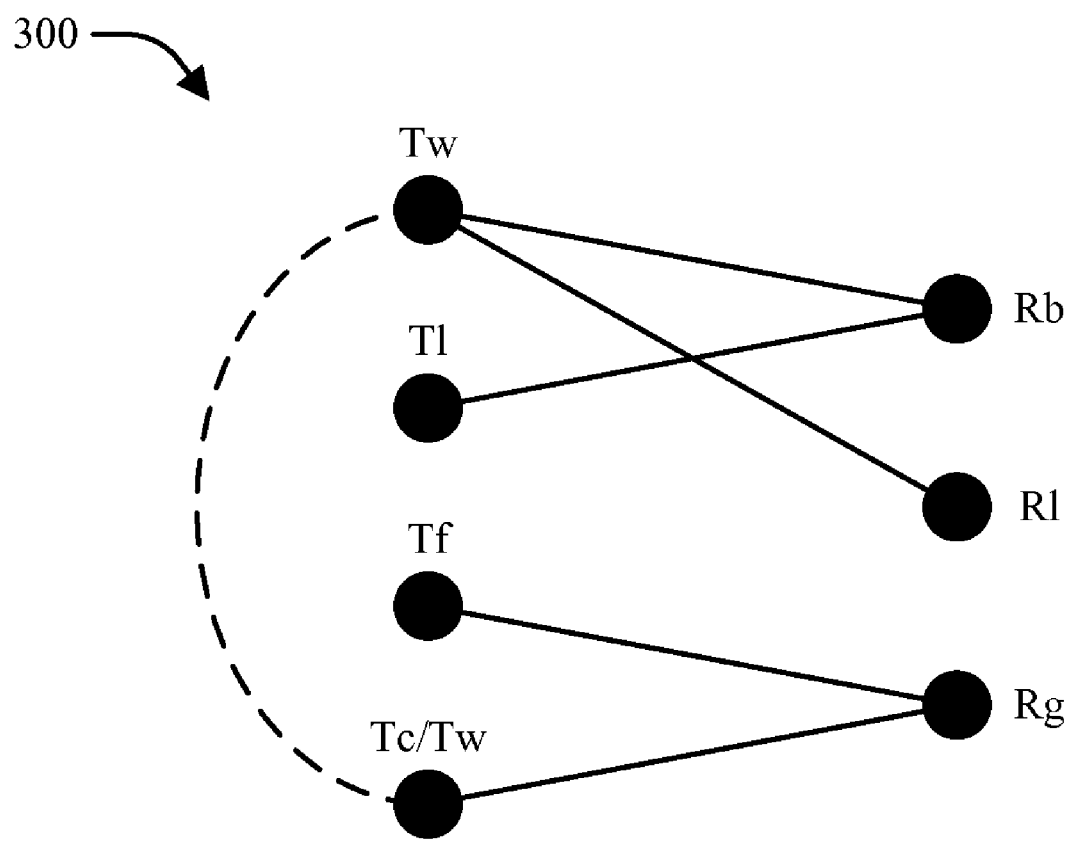
FIG. 3 illustrates an example set of radios that can be implemented in a wireless communication environment and respective potential collisions that can occur among the example set of radios.

In accordance with one aspect, CxM 240 can be utilized to manage operation of respective radios 220 utilized by wireless device 200 in order to avoid interference and/or other performance degradation associated with collisions between respective radios 220. By way of further illustration, graph 300 in FIG. 3 represents respective potential collisions between seven example radios in a given decision period. In the example shown in graph 300, the seven radios include a WLAN transmitter (Tw), an LTE transmitter (Tl), an FM transmitter (Tf), a GSM/WCDMA transmitter (Tc), an LTE receiver (Rl), a Bluetooth receiver (Rb), and a GPS receiver (Rg). The four transmitters are represented by four nodes on the left side of graph 300, and the three receivers are represented by three nodes on the right side of graph 300. A potential collision between a transmitter and a receiver is represented on graph 300 by a branch connecting the node for the transmitter and the node for the receiver. Accordingly, in the example shown in graph 300, collisions may exist between (1) a WLAN transmitter (Tw) and a Bluetooth receiver (Rb); (2) a LTE transmitter (Tl) and a Bluetooth receiver (Rb); (3) a WLAN transmitter (Tw) and a LTE receiver (Rl); (4) a FM transmitter (Tf) and a GPS receiver (Rg); and (5) a WLAN transmitter (Tw), a GSM/WCDMA transmitter (Tc), and a GPS receiver (Rg).

In one example, respective radios 220 can provide respective event reports or notifications that relate to events to be conducted by the respective radios 220. Based on such reports, a prioritization module 242 and/or other suitable means associated with CxM 240 can prioritize the event reports to facilitate optimal management of radios 220. In accordance with one aspect, CxM 240 can receive event reports from multiple radios 220 at a time. Further, a certain number of basic atomic events can be identified for radios 220 such that each event report from radios 220 is a composite event consisting of a combination of atomic events. In one example, prioritization module 242 and/or other suitable mechanisms associated with the core of CxM 240 can be configured with the priorities of the events reported from each radio 220 (e.g., as part of its processing) in order to decide which events are granted and which events are not granted. As respective events from a radio 220 can happen in many different combinations of underlying atomic events, it can be appreciated that a method for obtaining priorities of such combinations would be desirable. For example, it can be appreciated that assignment of priorities should be consistent so that relative priorities of composite events are higher if the constituent events have higher priorities. In addition, it can be appreciated that the relative priority of a composite event should be greater than the priority of any subset of its events. Thus, to the furtherance of at least the above ends, CxM 240 and prioritization module 242 can, in accordance with various aspects described herein, compute the composite priority of a combination of events based on an assignment of priorities of the basic atomic events.

Figure 4:
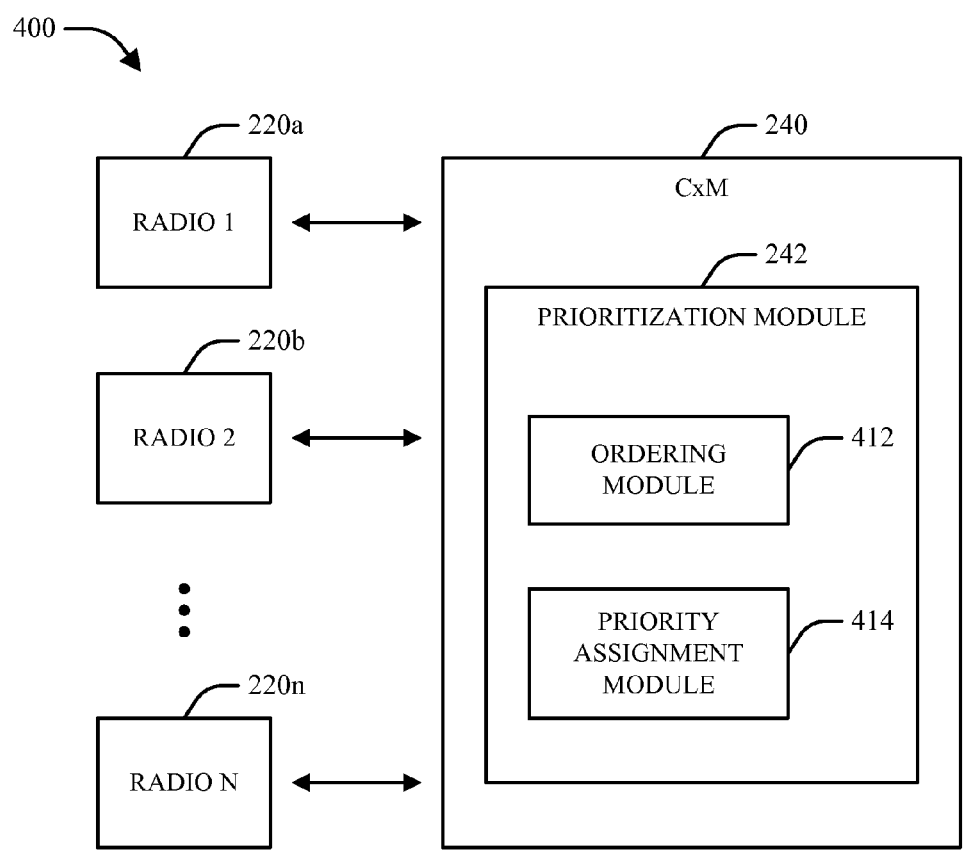
FIG. 4 is a block diagram of a system for prioritizing a set of radio events based on respective predefined ordering relationships in accordance with various aspects.

Referring next to FIG. 4, a block diagram of a system 400 is illustrated that provides further detail regarding the operation of CxM 240 and prioritization module 242. In accordance with one aspect, prioritization module 242 and/or any other suitable mechanism(s) can be leveraged by CxM 240 to assign respective priorities to composite events associated with radios 220. In one example as described above, composite events can be composed of one or more atomic events comprising various commands and/or other operations desirably performed by one or more radios 220. In another example, prioritization module 242 can identify a set of atomic events from which respective composite events are composed, as well as relative priorities of the set of atomic events. Subsequently, prioritization module 242 can leverage respective combinations (or subsets) of the identified atomic events to create a priority list for the composite events.

In accordance with another aspect, prioritization module 242 can include an ordering module 412 and/or any other suitable mechanism(s) to leverage partial orders of atomic events. For example, a partial order on a set can be informally defined as a relation which can compare two elements of a set (but not necessarily "any" two elements of the set). A set having such a relationship between its elements can accordingly be referred to as a partially ordered set. An example is the set of all subsets of a given set ordered by inclusion (e.g., $\subseteq$). Thus, for example, if
$\overline{S} = \{x1, x2, x3\}$, then the set of all subsets can be given by
$U = \{\emptyset, \{x1\}, \{x2\}, \{x3\}, \{x1,x2\}, \{x2,x3\}, \{x1,x3\}, \{x1,x2,x3\}\}$. It can be seen that $\{x2\} \subseteq \{x2,x3\}$, and accordingly it can be appreciated that there is an order between $\{x2\}$ and $\{x2,x3\}$. However, it can further be appreciated that there is no ordering between $\{x2\}$ and $\{x1,x3\}$ by inclusion. Thus, U is a partially ordered set.

Figure 5:
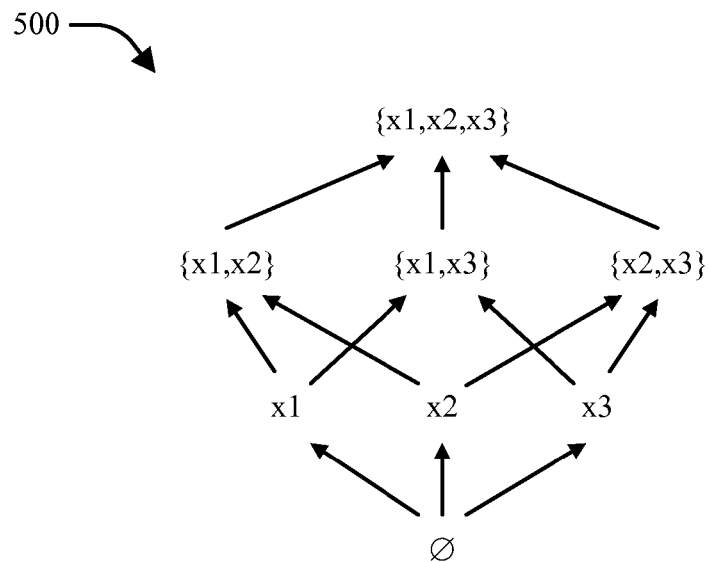
FIGS. 5-6 are diagrams that illustrate respective relationships between an example set of events in accordance with various aspects.

In one example, a Hasse diagram, such as diagram 500 in FIG. 5, can be utilized to illustrate the relationships between elements of a partially ordered set. Thus, the Hasse diagram for U can be drawn as shown in diagram 500, wherein elements having an ordering relationship are connected by arrows. In another example, the relative priorities of various atomic events associated with a wireless communication environment can be defined in advance. By way of specific, non-limiting example involving an LTE radio, a set of atomic events for the LTE radio can be defined as below in increasing order of relative priorities:
  1) SRS
  2) PRACH
  3) Data 0 (low priority data)
  4) Data 1 (high priority data)
  5) CQI/PMI
  6) RI
  7) Aperiodic CQI/PMI
  8) Aperiodic RI
  9) ACK
  10) SchedReq Based on the above set of atomic events, an event report can consist of one or more atomic events, such as {CQI/PMI, ACK}, {Data 0, SchedReq, SRS}, or the like.

Returning to FIG. 4, prioritization module 242 can further include a priority assignment module 414 and/or any other suitable mechanism(s), which can generate priorities for composite events. In one example, priority assignment module 414 can operate based on at least the following two conditions. First, the priority of a composite event should be greater than the priority of any subset of its events. Second, the priority of a composite event should be higher if the atomic events are of higher priority. In one example, these two conditions combined can be utilized to impose a partial order on all composite events.

Figure 6:
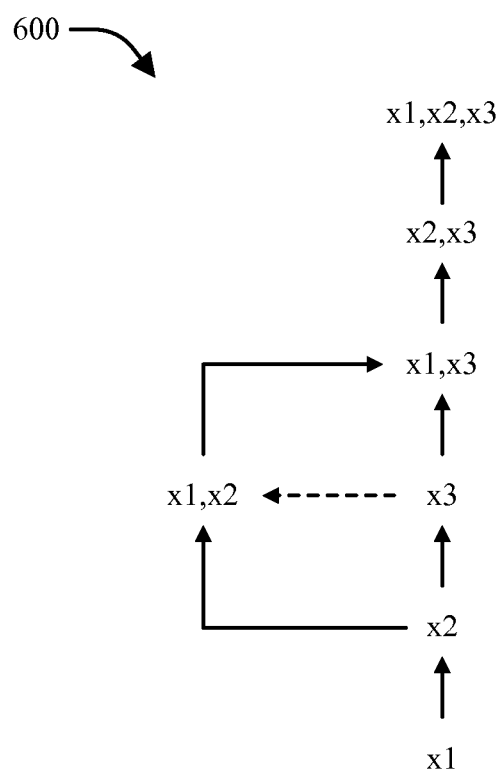

It can be appreciated that, by definition, a partial order will lead to a pair of incomparable events. Accordingly, the ordering of the atomic events by themselves may not lead to a consistent assignment of priorities of all composite events. This is illustrated by diagram 600 in FIG. 6. Accordingly, ordering module 412 and/or priority assignment module 414 can cooperate to fully prioritize a set of composite events as described in the following specific example. First, consider a set of atomic events ordered by priority such that x1<x2<x3. The Hasse diagram for the composite events can then be illustrated as shown in diagram 600. From diagram 600, it can be noted that there is no implicit order between x3 and (x1, x2). Accordingly, it can be appreciated that a priority assignment scheme should explicitly enforce a relation between x3 and (x1,x2). Such a relation is referred to as a forced order. Once a forced order is chosen (e.g., by ordering module 412), such as, for example, x3<(x1,x2) or (x1,x2)<x3, the Hasse diagram can be updated to incorporate this relationship. As shown in diagram 600, the forced order (x1,x2)<x3 is illustrated by a dotted line. It should be appreciated, however, that x3<(x1,x2) and/or any other suitable forced order could alternatively be utilized, provided that such forced order is defined and implemented consistently throughout a set of events as illustrated by diagram 600.

Figure 7:
FIG. 7 is a diagram of an example technique for assigning priorities to composite events in accordance with various aspects.

In accordance with one aspect, upon definition of one or more forced orders as described above, priority assignments for a set of composite events can be made (e.g., by priority assignment module 414). A specific, non-limiting example of a technique that can be utilized for assigning respective priority values to composite events is shown in diagram 700 in FIG. 7. As diagram 700 illustrates, the priorities of atomic events x1, x2 and x3 can be initialized to 1, 2, and 3, respectively. Subsequently, the priorities of composite events (x1, x2), (x1,x3), (x2,x3), and (x1,x2,x3) can be initialized to one plus the maximum of the priorities of their respective constituent atomic events. This is shown in the fourth column of diagram 700.

Next, the smallest repeated priority number can be found, which in the example illustrated in diagram 700 is 3. This is shown in the topmost outlined region of the fourth column of diagram 700. Among these events, the priorities can then be reassigned to satisfy Hasse relationships. If there is no Hasse relationship between two elements, then a forced order can be chosen. In the example shown, a forced order is chosen and recorded (e.g., x3 is given a priority value of 4 and (x1,x2) is given a priority value of 3).

Subsequently, the priorities of all other events higher than 3 are updated. Thus, any event in the bottommost outlined region in the fifth column of diagram 700 that contains a subset of the events shown in the topmost outlined region in the fifth column of diagram 700 can be updated to one level higher priority (e.g., 5). Next, the smallest repeated priority number can again be found, and the above steps can be repeated (e.g., by leveraging the fact that the remaining events are composite events each containing the atomic event x3 and assigning priorities based on the remaining subsets of atomic events). As shown in the sixth column of diagram 700, the output of this example algorithm is a priority number for each composite event.

In accordance with one aspect, the above algorithm can be generalized as follows. First, the priorities of atomic events $x_i$ and corresponding composite events can be initialized to the following:

$$P(x_i)=i, 1 \leq i \leq n$$

$$\forall k, P(x_{i_1}, \ldots, x_{i_k}) = \max_j(P(x_{i_j}))+1, \forall i_1, \ldots, i_k$$

Next, while some priorities are repeated, the smallest priority number p that is repeated is found, and the set S of events that have priority p is found. The priorities of events in S are then reassigned to distinct values greater than p, taking into account any Hasse relationship and breaking ties independently for non-comparable events. For all other events, such as x, not in S and having priority greater than p, all events in S that are comparable to x can then be found and the priority of x is reassigned to [(max of such events in S)+1] if the priority of x is not already more than that. Subsequently, all priorities are distinct and ordering is satisfied for comparable events.

Figure 8:
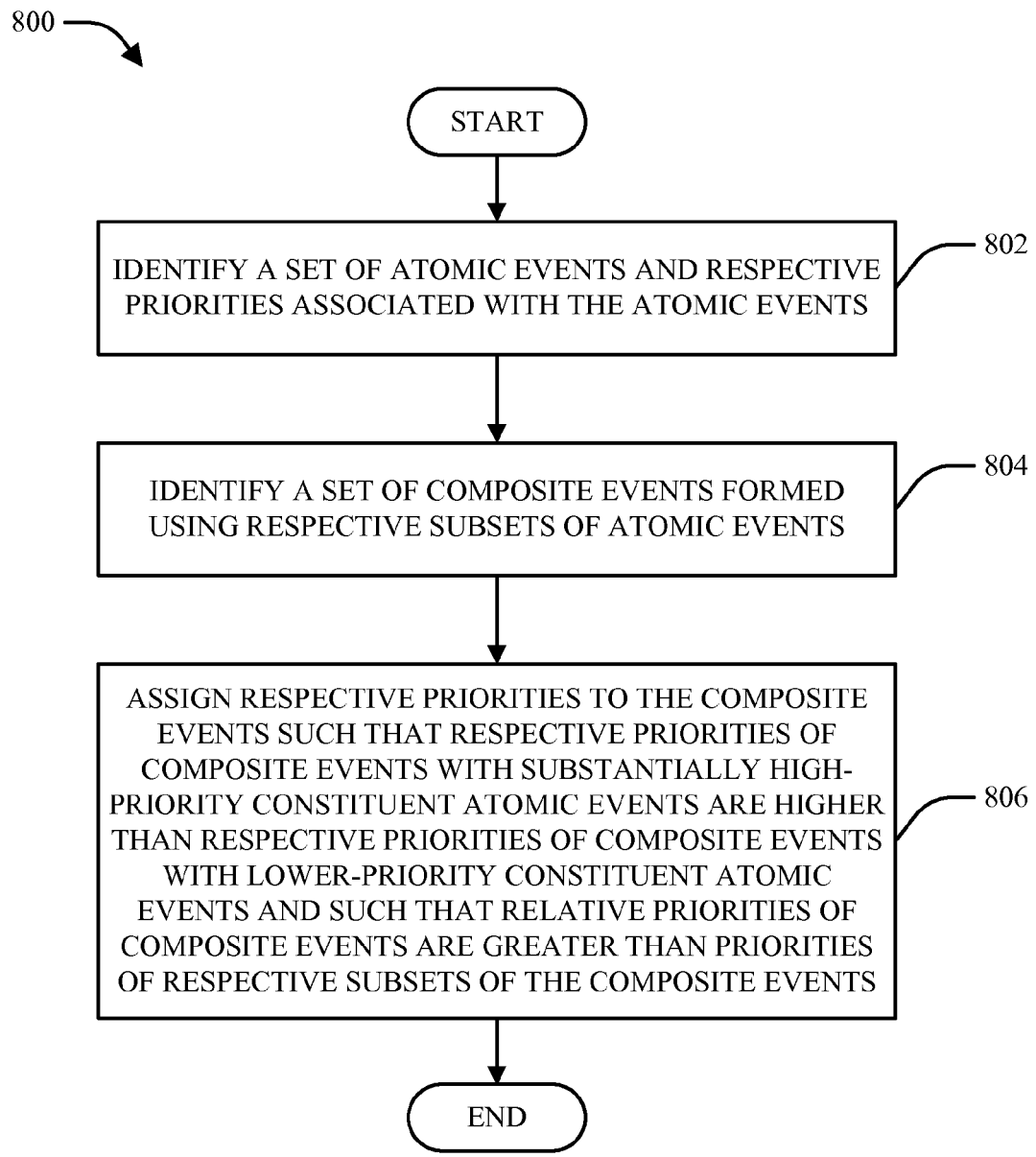
FIGS. 8-9 are flow diagrams of respective methodologies for assigning respective priorities to events associated with a wireless communication system.
Figure 9:
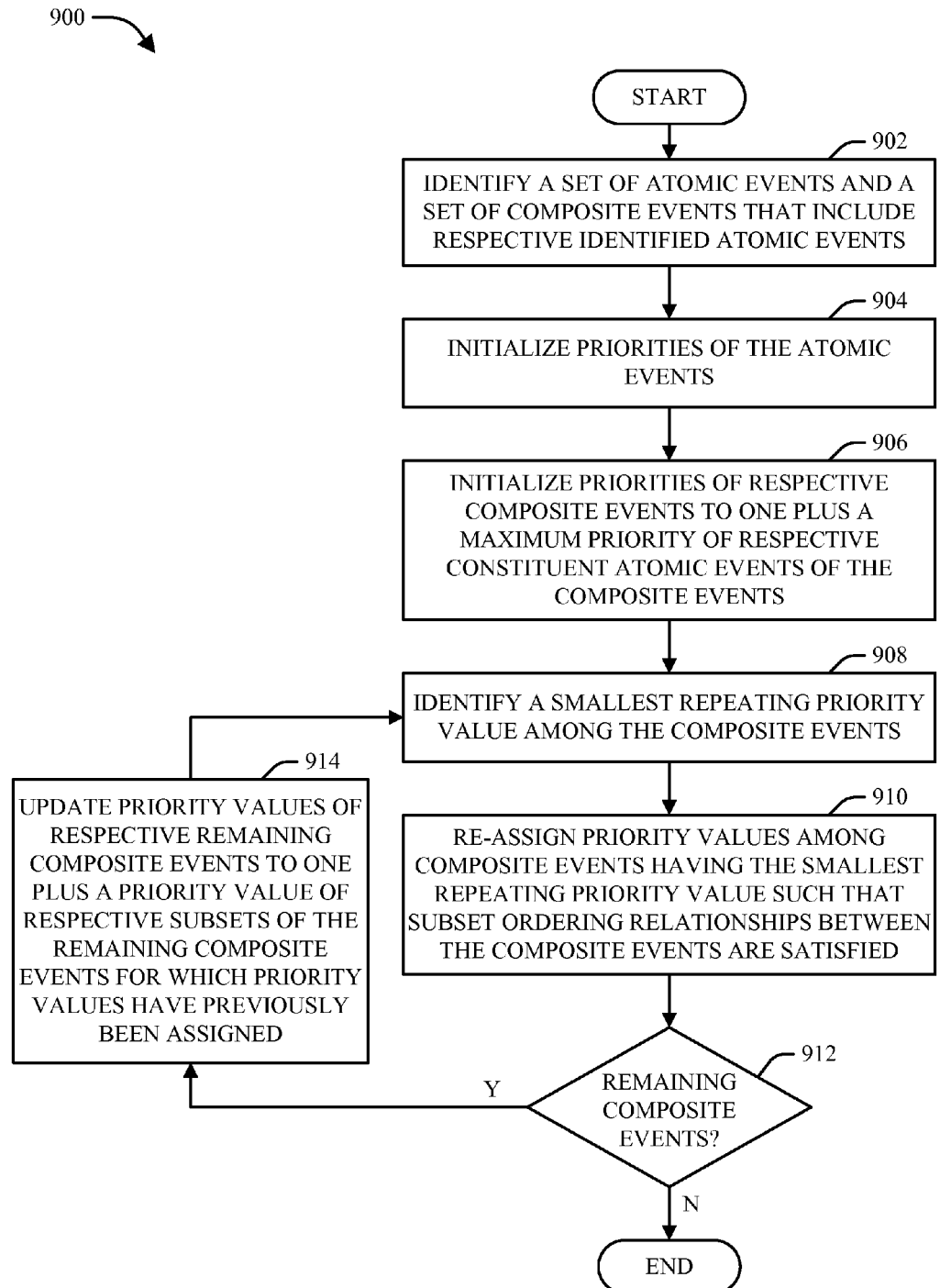

Referring now to FIGS. 8-9, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 8, illustrated is a methodology 800 for assigning respective priorities to events associated with a wireless communication system. It is to be appreciated that methodology 800 can be performed by, for example, a wireless device (e.g., wireless device 110 or 200, via a CxM 240) and/or any other appropriate network device. Methodology 800 can begin at block 802, wherein a set of atomic events (e.g., events associated with radios 220) and respective priorities associated with the atomic events are identified. At block 804, a set of composite events formed using respective subsets of atomic events identified at block 802 are identified. Methodology 800 can then conclude at block 806, wherein respective priorities are assigned to the composite events (e.g., using a prioritization module 242 associated with CxM 240) such that (1) respective priorities of composite events with substantially high-priority constituent atomic events are higher than respective priorities of composite events with lower-priority constituent atomic events and (2) relative priorities of composite events are greater than priorities of respective subsets of the composite events.

FIG. 9 illustrates another methodology 900 for assigning respective priorities to events associated with a wireless communication system. Methodology 900 can be performed by, for example, a wireless terminal and/or any other suitable network entity. Methodology 900 begins at block 902, wherein a set of atomic events and a set of composite events that include respective identified atomic events are identified. At block 904, priorities of the atomic events identified at block 902 are initialized (e.g., using a priority assignment module 414 and/or any other suitable mechanism(s) associated with a prioritization module 242 or a CxM 240). Next, at block 906, priorities of respective composite events identified at block 902 are initialized to one plus a maximum priority of respective constituent atomic events of the composite events.

At block 908, a smallest repeating priority value is then identified among the composite events for which priorities were initialized at block 906. At 910, priority values of the composite events having the smallest repeating priority value identified at block 908 can be re-assigned (e.g., using a priority assignment module 414) such that subset ordering relationships (e.g., as determined by an ordering module 412) between the composite events are satisfied. In one example, subset ordering relationships can be formed for use at block 910 by first determining whether an ordering relationship exists between given pairs of events, wherein at least one event in respective pairs of events is a composite event, and subsequently selecting and applying a forced order for respective pairs of events for which an ordering relationship does not exist. Additionally or alternatively, any other suitable technique(s) could be utilized.

Upon completing the acts described at block 910, methodology 900 can proceed to block 912, wherein it is determined whether remaining composite events exist for which a final priority value has not been assigned. In one example, the determination at block 912 can be performed by determining whether a set of distinct priorities has been obtained for the respective composite events identified at block 902, and/or by any other suitable means. Upon determining that such a distinct set of priorities has been obtained, methodology 900 can conclude. Otherwise, methodology 900 can proceed to block 914 from block 912, wherein priority values of respective remaining composite events can be updated to one plus a priority value of respective subsets of the remaining composite events for which priority values have been previously assigned (e.g., at block 910). In one example, various selection procedures can be utilized at block 914 to determine a subset priority to be utilized in updating a priority value for a remaining composite event. For example, a priority value for a composite event {x1, x2, x3} can be assigned at block 914 by adding one to a priority of {x1, x2}, a priority of x3, and/or a priority of any other subset of the event based on various selection criteria (e.g., a highest or lowest priority subset, etc.). Methodology 900 can then return to block 908 upon completing the acts described at block 914, such that the operations described at blocks 908 and 910 can be iteratively conducted until a sufficient set of distinct priority values is reached.

Figure 10:
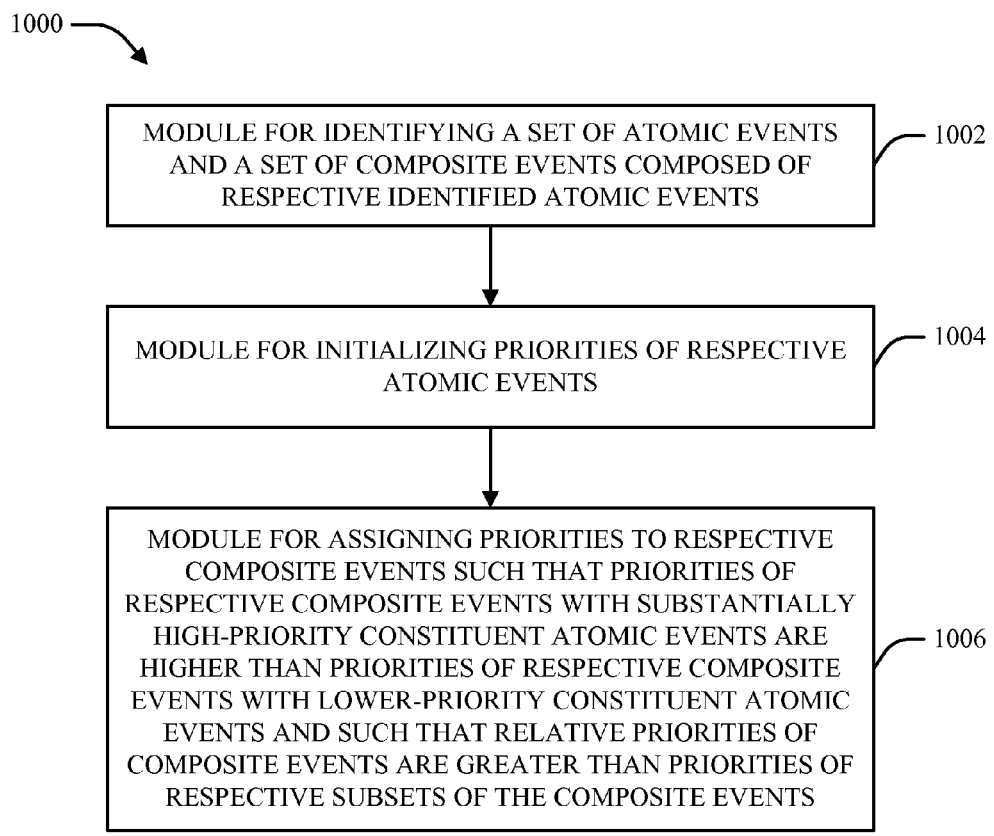
FIG. 10 is a block diagram of an apparatus that facilitates prioritization of composite events associated with a wireless communication environment.

Referring next to FIG. 10, illustrated is an apparatus 1000 that facilitates prioritization of composite events associated with a wireless communication environment. It is to be appreciated that apparatus 1000 is represented as including functional blocks, which can be functional blocks that represent functions implemented by a processor, software, or combination thereof (e.g., firmware). Apparatus 1000 can be implemented by a wireless device (e.g., wireless device 110 or 200) and/or another suitable network entity and can include a module 1002 for identifying a set of atomic events and a set of composite events composed of respective identified atomic events, a module 1004 for initializing priorities of respective atomic events, and a module 1006 for assigning priorities to respective composite events such that priorities of respective composite events with substantially high-priority constituent atomic events are higher than priorities of respective composite events with lower-priority constituent atomic events and such that relative priorities of composite events are greater than priorities of respective subsets of the composite events.

Figure 11:
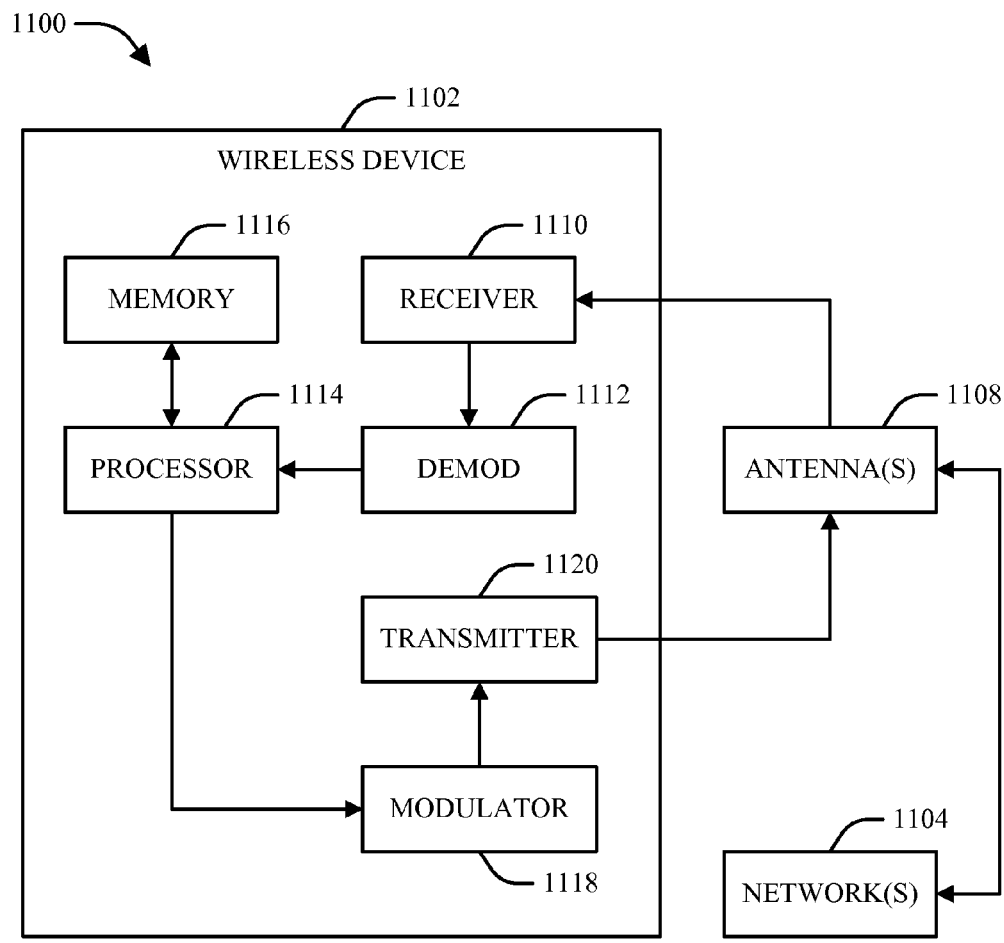
FIG. 11 is a block diagram of a wireless communications device that can be utilized to implement various aspects described herein.

FIG. 11 is a block diagram of a system 1100 that can be utilized to implement various aspects of the functionality described herein. In one example, system 1100 includes a wireless device 1102. As illustrated, wireless device 1102 can receive signal(s) from one or more networks 1104 and transmit to the one or more networks 1104 via one or more antennas 1108. Additionally, wireless device 1102 can comprise a receiver 1110 that receives information from antenna(s) 1108. In one example, receiver 1111 can be operatively associated with a demodulator (Demod) 1112 that demodulates received information. Demodulated symbols can then be analyzed by a processor 1114. Processor 1114 can be coupled to memory 1116, which can store data and/or program codes related to terminal 1102. Additionally, wireless device 1102 can employ processor 1114 to perform methodologies 800-900 and/or other similar and appropriate methodologies. Wireless device 1102 can also include a modulator 1118 that can multiplex a signal for transmission by a transmitter 1120 through antenna(s) 1108.

Figure 12:
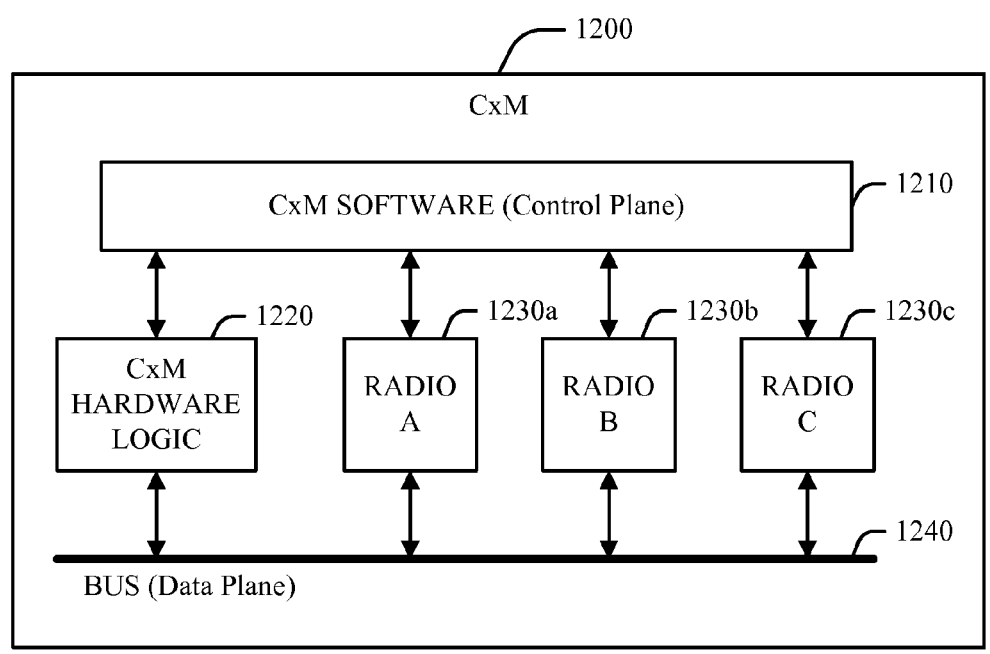
FIGS. 12-13 are block diagrams that illustrate respective aspects of an example coexistence manager that can be utilized to implement various aspects described herein.

Turning next to FIG. 12, an example implementation of a CxM 1200 that can be utilized to implement various aspects described herein is illustrated. In one example, if multiple radios that can potentially interfere with each other are utilized in a wireless communication system, CxM 1200 can be used to coordinate the respective radios. In one example, CxM 1200 can be implemented as a mixture of software and hardware by utilizing, for example, control plane CxM software 1210 and CxM hardware logic 1220.

In accordance with one aspect, CxM 1200 can be implemented as a centralized architecture such that respective radios 1230a-1230c can coordinate and/or send notifications to CxM hardware logic 1220, which can in turn send notifications back to respective radios 1230a-1230c. In another example, operation of CxM 1200 can be split into hardware and software to accommodate time scales associated with coexistence issues. For example, radios 1230a-1230c can provide notifications of an imminent radio event at a substantially fast time scale (e.g., on the order of 100-150 microseconds), and accordingly CxM hardware logic 1220 and/or a data plane bus 1240 between CxM hardware logic 1220 and radios 1230a-1230c can be utilized to accommodate expedient operation based on notifications. Additionally or alternatively, CxM software 1210 can be implemented in the control plane to facilitate operations that can occur on a slower time scale, such as coordination radios coming on or off, sleep mode operation, or the like.

Figure 13:
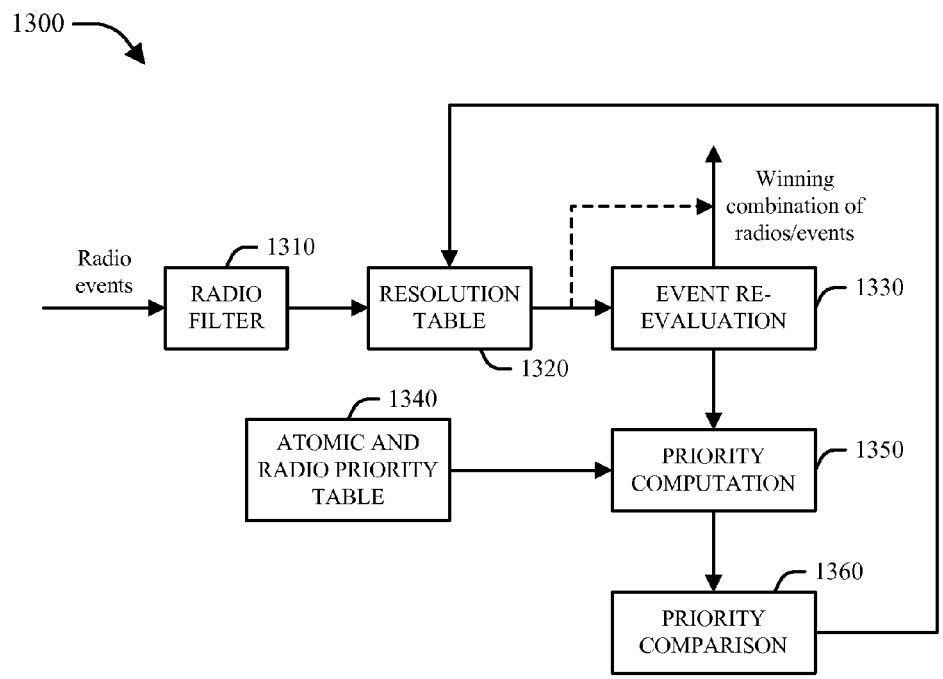

Diagram 1300 in FIG. 13 illustrates additional aspects of an example CxM implementation. As shown in diagram 1300, radio events can initially be processed by a radio filter 1310, which can identify groups or clusters of radios that can potentially interfere directly and/or indirectly. Next, a resolution table 1320 can be utilized to identify various parameters of the received events (e.g., transmit power, frequency subbands, receive power, tolerated interference, etc.) to determine whether the respective events can coexist.

Based on the operation of the resolution table 1320, an event re-evaluation block 1330 can then determine whether a highest priority (or "winning") combination of radios and/or events exists. If such a combination does not exist, priority computation block 1350 can determine relative priorities associated with events and/or groups of events. In one example, priority computation block 1350 can leverage an atomic and radio priority table 1340, which can be implemented as a table per radio carrying priorities of atomic events and another table carrying relative priorities across radios. In an example, both of such tables can be configured by CxM software and can be static over a given CxM software update.

Based on priorities obtained by priority computation block 1350, arbitration can be performed for various combinations of events via priority comparison block 1360. In accordance with one aspect, priority comparison block 1360 can select the highest priority combination of events and provide such information to resolution table 1320 for re-evaluation.

Figure 14:
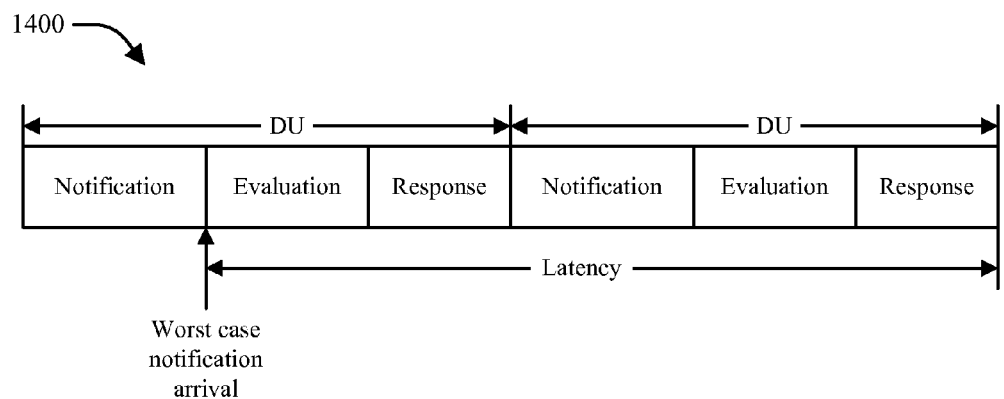
FIG. 14 illustrates operation of an example coexistence manager in time.

Turning to diagram 1400 in FIG. 14, an example timeline for CxM operation is illustrated. In one example, a CxM can operate according to a timeline divided into decision units (DUs) in time, which can be any suitable uniform or non-uniform length (e.g., 100 μs). By way of specific example, a DU can be divided into a notification phase (e.g., 50 μs) where various radios send notifications of imminent events, an evaluation phase (e.g., 30 μs) where notifications are processed, and a response phase (e.g., 20 μs) where commands are provided to various radios and/or other operations are performed based on actions taken in the evaluation phase. In one example, timeline 1400 can have a latency parameter defined by the worst case operation of timeline 1400, e.g., the timing of a response in the case that a notification is obtained from a given radio immediately following termination of the notification phase in a given DU.

With respect to the above description, one of ordinary skill in the art can appreciate that various aspects described above can be implemented by hardware, software, firmware, middleware, microcode, or any combination thereof When the systems and/or methods are implemented in software, firmware, middleware or microcode, program code or code segments, they can be stored in a machine-readable medium, such as a memory or storage device. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

Moreover, those of skill in the art can appreciate that information and signals can be represented using any of a variety of different technologies and techniques. For example, data, instructions, commands, information, signals, bits, symbols, and/or chips that may be referenced throughout the above description can be represented by voltages, currents, electromagnetic waves, magnetic fields or particles, optical fields or particles, or any combination thereof.

In addition, it is to be understood that the steps of the various methods and/or algorithms as described in connection with the disclosure above can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An example storage medium can be coupled to a processor such that the processor can read information from, and write information to, the storage medium. In the alternative, the storage medium can be integral to the processor. The processor and the storage medium can reside in an ASIC, which in turn can reside in a user terminal and/or in any other suitable location. Alternatively, processor and the storage medium can reside as discrete components in a user terminal.

The above description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is instead to be accorded the widest scope consistent with the principles and novel features disclosed herein. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    identifying a set of events comprising a set of atomic events and a set of composite events and a respective priority value associated with each of the atomic events, wherein atomic events comprise radio commands, other radio operations, or a combination thereof, and wherein each composite event is formed of constituent atomic events comprising a respective subset of the set of atomic events; and
    assigning respective priority values to the composite events,
    wherein the assigning assigns higher priority values to composite events formed of substantially high-priority constituent atomic events and lower priority values to composite events formed of lower-priority constituent atomic events, and
    wherein the assigning assigns priority values to composite events that are greater than priority values associated with the respective constituent atomic events forming the composite events.

2. The method of claim 1, wherein the assigning comprises:
    initializing priority values for the composite events to one plus a maximum of the priority values associated with the respective constituent atomic events forming the composite events;
    finding a smallest repeating priority value, wherein repeating puriority values are each associated with a plurality of the events comprising the set of atomic events and the set of composite events; and
    determining whether events among the plurality of events having the smallest repeating priority value have an existing ordering relationship, and if the ordering relationship is determined existent then,
    re-assigning priority values to the events having the smallest repeating priority value such that the existent existent ordering relationship is satisfied.

3. The method of claim 2, further comprising forming a partially ordered set of events comprising the set of atomic events and at least a subset of the set of composite events, wherein the partially ordered set of events defines the existent ordering relationships.

4. The method of claim 2, wherein the assigning further comprises:
    identifying composite events for which the re-assigning has not been performed; and
    updating priority values for the composite events for which the re-assigning has not been to a priority value of one plus a highest priority value assigned to composite events for which the re-assigning has been performed.

5. The method of claim 2, wherein,
    for a events among the events having the smallest repeating priority value and determined as not having an existent ordering relationship selecting a forced order for the events; and
    re-assigning priority values to the events by applying the forced order.

6. The method of claim 2, wherein the assigning further comprises:
    identifying composite events for which the re-assigning has not been performed; and updating priority values for the composite events for which the re-assigning has not been performed to a priority value of one plus a priority value assigned to a subset the composite events for which the re-assigning has been performed.

7. The method of claim 6, further comprising:
determining, upon completing the finding, re-assigning, and updating, if composite events have not been assigned distinct priority values; and
repeating the finding, re-assigning, and updating distinct priority values for the composite events determined as not having been assigned distinct priority values.

8. The method of claim 1, further comprising:
receiving information relating to one or more events subsequent to assigning respective priority values to the composite events; and
selecting one or more events to be granted for which information has been received according to the priority values assigned to composite evenfs corresponding to the one or more events.

9. A wireless communications apparatus, comprising:
a memory that stores data relating to a set of events comprising a set of atomic events and a set of composite events, wherein the atomic events comprise radio commands, other radio operations or a combination thereof, and each composite event is formed of constituent atomic events comprising a subset of the set of atomic events; a
a processor configured to initialize the atomic events to respective associated priority values and to assign respective priority values to the composite events,
wherein the processor is configured to assign higher priority values to composite events having substantially high-priority constituent atomic events and lower priority values to composite events having lower-priority constituent atomic events and to assign priority values to composite events to be greater than priority values associated with the respective constituent atomic events forming the composite events.

10. The wireless communications apparatus of claim 9, wherein the processor is further configured to;
initialize priority values for the composite events to one plus a maximum of priority values associated with the respective constituent atomic events forming the composite events,
find a smallest repeating priority value, wherein repeating priority values are associated with a plurality of the events comprising the set of atomic events and the set of composite events; and
determine whether events among the events having the smallest repeating priority value have an existing ordering relationship and, if the ordering relationship is determined existent, then to
re-assign priority values to the events having the smallest repeating priority value such that the ordering relationships are satisfied.

11. The wireless communications apparatus of claim 10, wherein the processor is further configured to form a partially ordered set of events comprising the set of atomic events and at least a subset of the set of composite events, and to define the existent ordering relationships based on the partially ordered set of events.

12. The wireless communications apparatus of claim 10, wherein the processor is further configured to identify composite events for which priority value assignment has not previously been performed and to update priority values for the composite events for which priority value assignment has not previously been performed to a priority value of one plus the highest priority value assigned to composite events for which the re-assigning has been performed.

13. The wireless communications apparatus of claim 10, wherein the processor is further configured to select, for events among the events having the smallest repeating priority value and determined as not having an existent ordering relationship a forced order for the pair of events and to re-assign priority values to the pair of events by applying the forced ordering.

14. The wireless communications apparatus of claim 10, wherein the processor is further configured to identify respective subsets having re-assigned priority values within composite events for which priority value assignment has not previously been performed and to update priority values for the respective composite events for which priority value assignment has not previously been performed to a priority value of one plus the priority value assigned to a subset of the composite event.

15. The wireless communications apparatus of claim 14, wherein the processor is further configured to repeat finding of a smallest repeating priority value, re-assignment of priority values, and updating of priority values upon determining that distinct priority values have not been assigned to all the composite events.

16. The wireless communications apparatus of claim 9, wherein the processor is further configured to receive information relating to one or more events subsequent to assignment of respective priority values to the set of composite events and to selectively grant one or more of the events for which information has been received, wherein the selective grant is according to the priority values assigned to composite events corresponding to the one or more events.

17. An apparatus, comprising:
means for identifying a set of events comprising a set of atomic events and a set of composite events, the atomic events comprising radio commands, other radio operations or a combination thereof, and each of the composite events respectively formed of constituent atomic events comprising a subset of the identified set of atomic events;
means for initializing respective priority numbers for the atomic events; and
means for assigning respective priority numbers to the composite events, wherein the assigning assigns higher priority numbers to composite events comprising substantially high-priority constituent atomic events and lower priority numbers to composite events comprising lower-priority constituent atomic events and assigns priority numbers to composite events that are greater than priority numbers associated with the respective subsets of the atomic events forming the composite events.

18. The apparatus of claim 17, wherein the means for assigning comprises:
means for initializing priority numbers for the composite events to one plus a maximum of priority numbers associated with the respective constituent atomic events of the composite events;
means for identifying a lowest repeating priority number, wherein repeating priority numbers are associated with a plurality of the events comprising the set of atomic events and the set of composite events; and
means for determining whether a pair of the events having the smallest repeating priority number have an existing ordering relationship and, if the ordering relationship is determined existent, then re-assigning priority numbers to the pair of events having the smallest repeating priority number such that the ordering relationships are satisfied.

19. The apparatus of claim 18, wherein the means for re-assigning priority numbers is configured to include in the re-assigning:
selecting, for a pair of events among the events having the smallest repeating priority number and determined as not having an existent ordering relationship a forced order for the pair of events; and
re-assigning priority numbers to the pair events by applying the forced order.

20. The apparatus of claim 18, wherein the means for determining whether events among the plurality of events having the smallest repeating priority number have an existent ordering relationship is configured to form a partially ordered set of events comprising the set of atomic events and at least a subset of the set of composite events, and to determine the existent ordering relationships based on the partially ordered set of events.

21. The apparatus of claim 18, wherein the means for assigning is further configured to include in the re-assigning:
identifying composite events not assigned priority numbers; and
updating priority numbers for the composite events not assigned priority to a priority number of one plus a highest priority number assigned to a the composite events already assigned priority numbers.

22. The apparatus of claim 18, wherein the means for assigning is further configured to include in the re-assigning:
identifying composite events not assigned priority numbers; and
updating priority numbers for the composite events not assigned priority numbers to a priority number value of one plus a priority number assigned to a subset of the composite events already assigned priority numbers.

23. The apparatus of claim 22, further comprising:
means for determining whether substantially all the composite events have been assigned distinct priority numbers; and
means for repeating operation of the means for identifying a lowest repeating priority number, the means for re-assigning, and the means for updating upon determining that substantially all the composite events are not assigned distinct priority numbers.

24. The apparatus of claim 17, further comprising:
means for receiving respective notifications of one or more events subsequent to assignment of priority numbers to the set of atomic events and the set of composite events; and
means for granting one or more events for which notifications have been received wherein the granting is according to the priority numbers assigned to composite events corresponding to the one or more events.

25. A computer program product, comprising:
a computer-readable non-transitory medium, comprising:
code for causing a computer to identify a set of events comprising a set of atomic events and a set of composite events, the atomic events comprising radio commands, other radio operations or a combination thereof, and each of the composite events respectively formed of constituent atomic events comprising a subset of one or more of the identified atomic events;
code for causing a computer to initialize priority numbers of the atomic events; and
code for causing a computer to assign priority numbers to the composite events, wherein the code causes the computer to assign higher priority numbers to composite events with substantially high-priority constituent atomic events and to assign lower priority numbers to composite events with lower-priority constituent atomic events and causes the computer to assign priority numbers to composite events that are greater than the priority numbers of the subsets of atomic events forming the composite events.

26. The computer program product of claim 25, wherein the code for causing a computer to assign comprises:
code for causing a computer to initialize priority numbers for composite events to one plus a maximum of priority numbers associated with the respective constituent atomic events of the composite events;
code for causing a computer to identify a lowest repeating priority number, wherein repeating priority numbers are associated with a plurality of the events comprising the set of atomic events and the respective composite events;
code for causing a computer to determine whether the events having the smallest repeating priority value have an existing ordering relationship, and
code for causing a computer, if the ordering relationship is determined existent, to re-assign priority numbers to the events having the smallest repeating priority number such the ordering relationships are satisfied.

27. The computer program product of claim 26, wherein the code for causing a computer to determine whether events among the plurality of events having the smallest repeating priority number have an existent ordering relationship includes code for causing a computer to form a partially ordered set of events comprising the set of atomic events and at least a subset of the set of composite events, and code for causing a computer to determine the existent ordering relationships based on the partially ordered set of events.

28. The computer program product of claim 26, wherein the code for causing a computer to assign further comprises:
code for causing a computer to identify respective composite events that have not previously been processed via execution of the code for causing a computer to re-assign; and
code for causing a computer to update priority values for the composite events that have not previously been processed via execution of the code for causing a computer to re-assign to one plus the highest priority value assigned the composite events that have been processed via execution of the code for causing a computer to re-assign.

29. The computer program product of claim 26, wherein the code for causing a computer to assign comprises:
code for causing a computer to select, for events among the events having the smallest repeating priority number and determined as not having an existent ordering relationship, a forced order; and
code for causing a computer to re-assign priority to the pair of events by applying the forced order.

30. The computer program product of claim 26, wherein the code for causing a computer to assign further comprises:
code for causing a computer to identify respective composite events that have not previously been processed via execution of the code for causing a computer to re-assign; and
code for causing a computer to update priority values for the composite events that have not previously been processed via execution of the code for causing a computer to re-assign to one plus a priority value assigned to a subset of the composite events that have been processed via execution of the code for causing a computer to re-assign.

31. The computer program product of claim 30, wherein the computer-readable non-transitory medium further comprises:
   code for causing a computer to determine whether substantially all the composite events are assigned to distinct priority numbers; and
   code for causing a computer to repeat execution of the code for causing a computer to identify a lowest repeating priority number, the code for causing a computer to re-assign, and the code for causing a computer to update upon determining that substantially all the composite events are not assigned to distinct priority numbers.

32. The computer program product of claim 25, wherein the computer-readable non-transitory medium further comprises:
   code for causing a computer to receive respective notifications of one or more events subsequent to assignment of priority numbers to the set of atomic events and the set of composite events; and
   code for causing a computer to grant one or more events for which notifications have been received wherein the granting is according to the priority numbers assigned to composite events corresponding to the one or more events.

33. An integrated circuit that executes a set of machine-executable instructions, the set of machine-executable instructions comprising:
   identifying a set of events comprising a set of atomic events and a set of composite events, and respective priority values associated with the atomic events, wherein the atomic comprise radio commands, other radio operations or a combination thereof, and wherein each composite event is formed of constituent atomic events comprising a respective subset of the set of atomic events; and
   assigning respective priority values to the composite events,
   wherein the assigning assigns higher priority values to composite events with substantially high-priority constituent atomic events and lower priority values to composite events having lower-priority constituent atomic events, and
   assigns priority values to composite events that are greater than priority values associated with the respective subsets of the atomic events forming the composite events.

34. The integrated circuit of claim 33, wherein the assigning comprises:
   initializing priority values for respective composite events to one plus a maximum of priority values associated with constituent atomic events of the respective composite events;
   finding a smallest repeating priority value, wherein repeating priority values are associated with a group of the events comprising the set of atomic events and the set of composite events; and
   determining whether events among the group of events having the smallest repeating priority value have an existing ordering relationship, and if the ordering relationship is determined existent then
   re-assigning priority values to the composite events having the smallest repeating priority value such that the ordering relationships are satisfied.

35. The integrated circuit of claim 34, wherein determining whether events among the group of events having the smallest repeating priority number have an existent ordering relationship includes forming a partially ordered set of events comprising the set of atomic events and at least a subset of the set of composite events, and for determining the existent ordering relationships based on the partially ordered set of events.

36. The integrated circuit of claim 34, wherein the set of machine-executable instructions further comprises selecting, for a group of events among the events having the smallest repeating priority value and determined as not having an existent ordering relationship, a forced order for the group of events; and
   re-assigning priority values to the group of events by applying the forced order.

37. The integrated circuit of claim 34, wherein the assigning further comprises updating priority values for respective composite events having a priority value higher than the smallest repeating priority value to one plus the highest priority value utilized by the integrated circuit during execution of the re-assigning.

38. The integrated circuit of claim 37, wherein the set of machine-executable instructions further comprises:
   determining whether distinct priority values have been assigned to the composite events upon completing execution of the finding, the re-assigning, and the updating; and
   repeating execution of the finding, the re-assigning, and the updating upon determining that distinct priority values have not been assigned to the composite events.

39. The integrated circuit of claim 33, wherein the set of machine-executable instructions further comprises:
   receiving respective notifications of one or more events subsequent to assigning respective priorities to the set of composite events; and
   selecting one or more events for which notifications have been received to be granted, wherein the granting is according to the priority numbers assigned to the composite events corresponding to the one or more events.

* * * * *